(12) United States Patent
Sivakumar et al.

(10) Patent No.: US 12,333,392 B2
(45) Date of Patent: Jun. 17, 2025

(54) DATA DE-IDENTIFICATION USING SEMANTIC EQUIVALENCE FOR MACHINE LEARNING

(71) Applicant: International Business Machines Corporation, Armonk, NY (US)

(72) Inventors: Gandhi Sivakumar, Bentleigh (AU); Lynn Kwok, Bundoora (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 1072 days.

(21) Appl. No.: 17/318,022

(22) Filed: May 12, 2021

(65) Prior Publication Data

US 2022/0366294 A1 Nov. 17, 2022

(51) Int. Cl.
G06F 3/0482 (2013.01)
G06F 16/23 (2019.01)
G06F 40/30 (2020.01)
G06N 20/00 (2019.01)

(52) U.S. Cl.
CPC ......... *G06N 20/00* (2019.01); *G06F 16/2379* (2019.01); *G06F 40/30* (2020.01)

(58) Field of Classification Search
CPC ..... G06N 20/00; G06F 16/2379; G06F 40/30; G06F 16/906
See application file for complete search history.

(56) References Cited

U.S. PATENT DOCUMENTS

| 6,845,393 | B1 | 1/2005 | Murphy |
| 8,001,607 | B2 | 8/2011 | Stull |
| 8,468,244 | B2 | 6/2013 | Redlich |
| 8,881,019 | B2 | 11/2014 | Gupta |
| 9,323,948 | B2 | 4/2016 | Gupta |
| 11,657,307 | B1 * | 5/2023 | Bodapati ................ G06N 20/00 706/15 |
| 11,978,438 | B1 * | 5/2024 | Ramakrishna ...... G10L 15/1815 |
| 2009/0132419 | A1 | 5/2009 | Grammer |
| 2010/0042583 | A1 | 2/2010 | Gervais |
| 2015/0254555 | A1 | 9/2015 | Williams, Jr. |

(Continued)

FOREIGN PATENT DOCUMENTS

| CN | 108829682 A | * | 11/2018 | ....... G06F 16/90332 |
| CN | 110502675 A | * | 11/2019 | ....... G06F 16/90332 |

(Continued)

OTHER PUBLICATIONS

"Anonymisation and Personal Data," Finnish Social Science Data Archive (FSD), Dec. 2020, 33 pages.

(Continued)

*Primary Examiner* — Hassan Mrabi
(74) *Attorney, Agent, or Firm* — Randy Tejeda (57) ABSTRACT

An approach is provided in which the approach detects a set of personal information data corresponding to a set of users in a set of training data. The approach transforms the set of training data into a set of semantically equivalent training data by replacing the set of personal information with a set of semantic equivalent data. The approach then trains a machine learning model using the set of semantically equivalent training data.

20 Claims, 10 Drawing Sheets

(56) References Cited

U.S. PATENT DOCUMENTS

| | | | |
|---|---|---|---|
| 2017/0235848 A1* | 8/2017 | Van Dusen | G06Q 10/101 |
| | | | 705/12 |
| 2019/0065470 A1* | 2/2019 | Matthews | G06N 7/01 |
| 2019/0332667 A1* | 10/2019 | Williams | G06N 5/022 |
| 2020/0161005 A1* | 5/2020 | Lyman | G06N 5/04 |
| 2020/0334381 A1* | 10/2020 | Yarowsky | G06F 40/166 |
| 2020/0356686 A1* | 11/2020 | Vijayvargiya | G06F 21/568 |
| 2021/0192134 A1* | 6/2021 | Yue | G06F 40/40 |
| 2022/0067289 A1* | 3/2022 | Xu | G06F 40/247 |
| 2023/0186201 A1* | 6/2023 | Cella | G05B 19/4183 |
| | | | 705/7.17 |
| 2024/0161035 A1* | 5/2024 | Lyman | G16H 10/20 |

FOREIGN PATENT DOCUMENTS

| | | | | |
|---|---|---|---|---|
| CN | 112800773 A | * | 5/2021 | ......... G06F 16/9024 |
| EP | 3092776 A1 | | 11/2016 | |
| JP | 7576032 B2 | * | 10/2024 | ........... A61B 5/0022 |
| KR | 20210143879 A | * | 11/2021 | ............ G06F 21/53 |
| WO | 2015103514 A | | 7/2015 | |
| WO | WO-2021021942 A1 | * | 2/2021 | ............ G06F 1/163 |
| WO | WO-2021247069 A1 | * | 12/2021 | ............ B25J 9/1697 |

OTHER PUBLICATIONS

Hirsch, "Anonymize-It: The General Purpose Tool for Data Privacy Used by the Elastic Machine Learning Team," Engineering, Elasticsearch, Aug. 2018, 5 pages.

"Considerations for Sensitive Data within Machine Learning Datasets," Google, Dec. 2020, 10 pages.

Garfinkel, "De-Identification of Personal Information," National Institute of Standards and Technology, U.S. Department of Commerce, Internal Report 8053, Oct. 2015, 54 pages.

Chew et al. "Privacy protection in machine learning: The state-of-the-art for a private decision tree," Security and Authentication, Jan. 2017, 17 pages.

* cited by examiner

POLICY MAP

| USER_ID | POLICY |
|---|---|
| PROD_ID | ALLOW_ACCESS |
| MLM_1 | DENY_ACCESS |
| MLM_2 | SEMANTIC_ACCESS |
| MLM_3 | SEMANTIC_ACCESS |
| MLM_4 | DENY_ACCESS |

API ATTRIBUTE MAP

| ATTR_NAME | PID POLICY |
|---|---|
| NAME | TRUE |
| AGE | TRUE |
| LOCATION | FALSE |
| FAVORITE_DRINK | FALSE |
| ... | ... |

DATA DE-IDENTIFICATION USING SEMANTIC EQUIVALENCE FOR MACHINE LEARNING

BACKGROUND

A cognitive network (CN) is a new type of data network that utilizes cutting edge technology from several research areas to solve problems in current networks (e.g., machine learning, knowledge representation, etc.). Cognitive networks are aimed to remember the past, interact with humans, continuously learn, and refine future responses. Their cognitive capabilities enrich human needs automation based on time and situation and provide more dynamic responses and user satisfaction.

A cognitive network typically includes many machine learning models with different functions. A machine learning model typically includes input feature sets and a mathematical model to compute outcomes. Its outcome varies based on the type of machine learning model, its algorithm, input training corpus, and other interrelated fields. The more accurate and complete an input training corpus is utilized to train a machine learning model, the more accurate and complete the outcome of the machine learning model during runtime operation. Similarly, the more accurate and complete query data fed into the machine learning model for predictions, the more accurate and complete the machine learning model outcome.

BRIEF SUMMARY

According to one embodiment of the present disclosure, an approach is provided in which the approach detects a set of personal information data corresponding to a set of users in a set of training data. The approach transforms the set of training data into a set of semantically equivalent training data by replacing the set of personal information with a set of semantic equivalent data. The approach then trains a machine learning model using the set of semantically equivalent training data.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
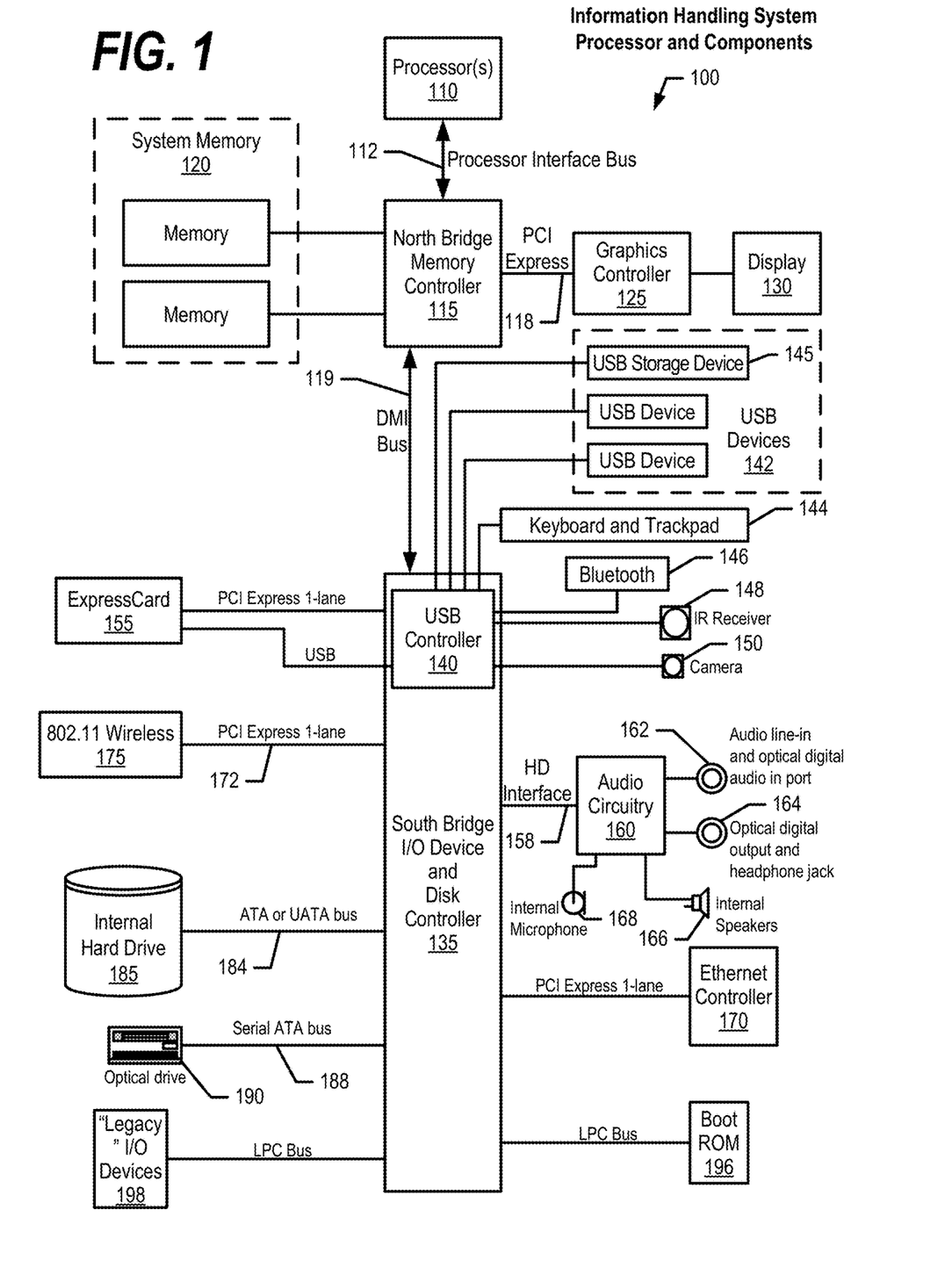
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
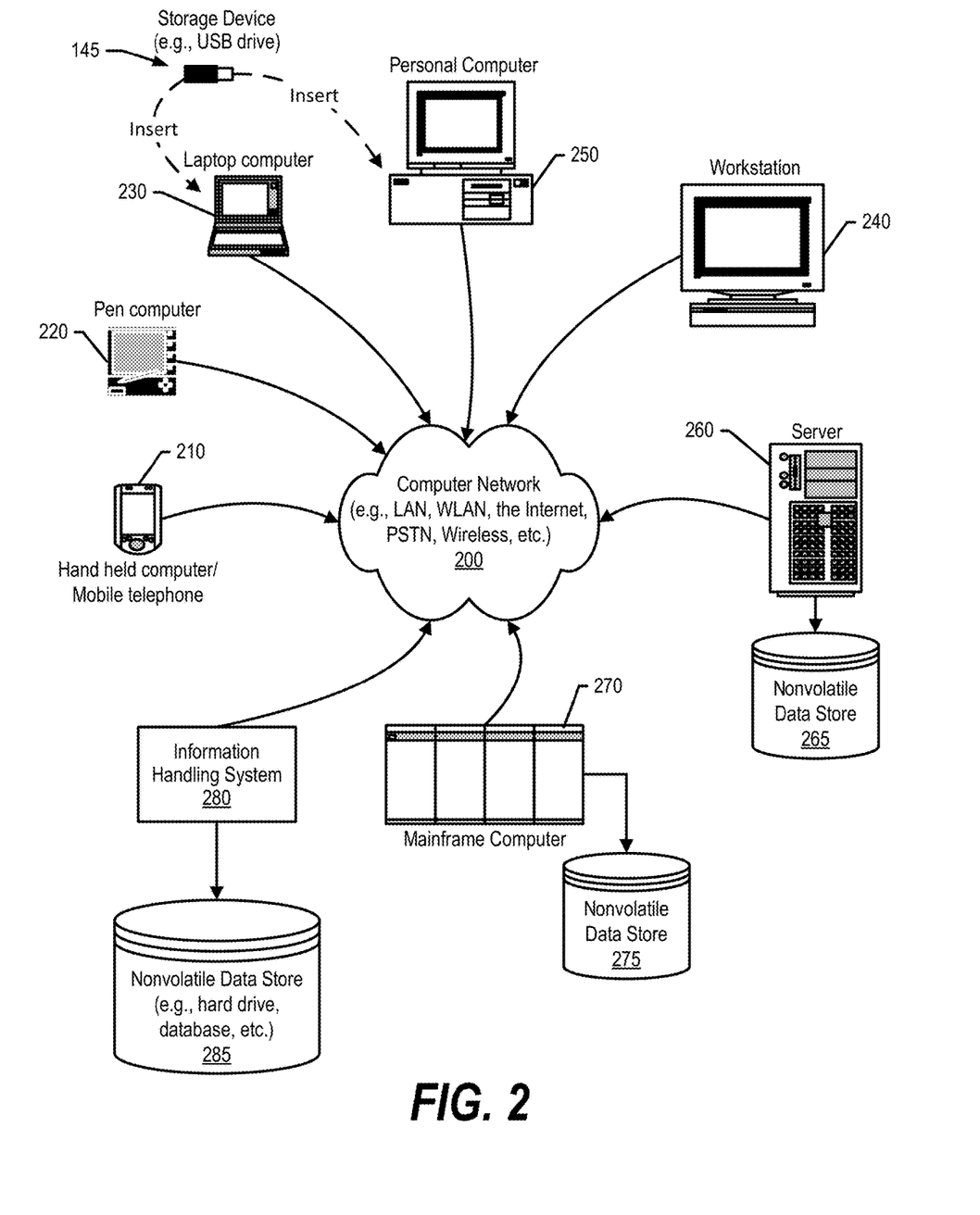
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, the accuracy and completeness of a machine learning model's results depend upon the accuracy and completeness of its training data and subsequent query. A challenge found with today's machine learning model training approaches is that the training data is typically "fake data" because utilizing actual user personal information data has many restrictions because the personal information data cannot be fed directly into machine learning models. As such, although the actual user personal information data provides for better training, today's approaches do not provide a way to generate the training corpus using the actual user personal information data.

Today's mechanisms mask personal information from other data in dataset feature vectors and offers a limited set of non-personal information for machine learning model training. Some approaches even generate fake personal information data features for model training, which decreases the model efficiency for making real-time decisions. As personal information data in a training corpus is extrapolated, the chances of result outliers increase and, in turn, produce less confident outcomes.

When a real time machine learning model is deployed in a cloud environment, sending a query with computational parameters to the machine learning model also has challenges as the computational parameters may include personal information and related restrictions. Some approaches use mechanisms that encrypt the user personal information data or hide the personal information data using masking and encryption techniques, but the machine learning model does not understand the masked data or encrypted data and is therefore unusable by the machine learning model.

In short, machine learning models provide better predictions when attributes in feature vectors are supplied correctly, both in training and in queries. In today's approaches, the de-identification and data masking deletes the original contents that, in turn, eliminates its meaning. As certain attributes become meaningless, the machine learning model does not accurately articulate insights from the limited parameters and decreases the prediction accuracy.

FIGS. 3 through 10 depict an approach that can be executed on an information handling system that provides an intelligent information masking method using semantic equivalents of a user's personal information, also referred to herein as "personal information data." The approach executes in a machine learning model's source dataset (feature vectors) access monitor for training, and at a client device for runtime queries, to transform personal information data into semantic equivalences while maintaining meaning to the machine learning model. The approach uses a semantic analysis engine that gathers the user personal information data from dataset manager functions and accordingly computes sematic equivalents of the data, which the approach sends to the machine learning model as de-identified data to the machine learning model. As the data is replaced with a semantic proximate, the dimension retention is achieved and is usable for training and/or while computing for a prediction outcome.

In one embodiment, the approach provides better machine learning model outcomes without sharing the personal information data and with dimension retention of the model. In another embodiment, the machine learning model training improves because of attribute relevance and better outcome expectations. In yet another embodiment, the approach de-identifies user data in networked machine learning model invocation and protects the personal information.

In yet another embodiment, the approach uses a semantic engine to locate a broader semantic proximate and therefore re-identification is unfeasible at a target location. In yet another embodiment, machine learning model efficiency is achieved with the same model function, training corpus, and the metadata structure. The semantic equivalence in the training corpus increases decision confidence.

In yet another embodiment, the approach is useful with cognitive machine learning model APIs and has a need to share the data for outcome derivation. In yet another embodiment, approach adopts dynamic personal information data attributes' addition and deletion in local mapping database that helps deliver real time user benefits of cognitive substitution.

Figure 3:
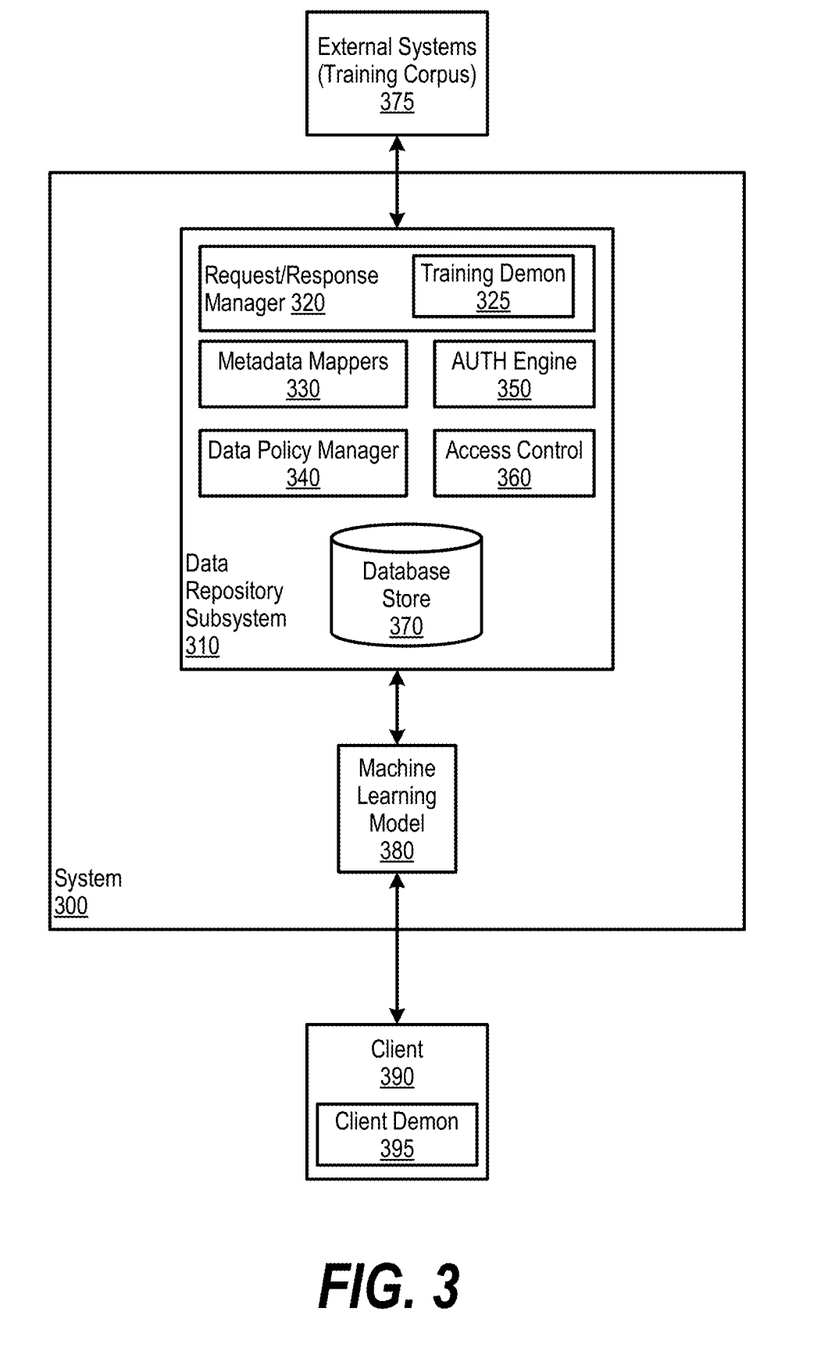
FIG. 3 is an exemplary diagram showing a system that de-identifies user data for machine learning model training and also receives de-identified user data for scoring.

FIG. 3 is an exemplary diagram showing a system that de-identifies personal information data for machine learning model training and also de-identifies personal information data for query scoring.

System 300 includes data repository subsystem 310, which enables a new access permission with "sematic equivalence." Data repository subsystem 310 includes request/response manager 320, which includes training demon 325. Data repository subsystem 310 also includes metadata mapper 330, data policy manager 340, authorization engine 350, access control 360, and database store 370.

Request/response manager 320 manages requests and responses from/to external systems 375 and machine learning model 380. As discussed herein, training demon 325 interfaces with a semantic engine to replace sensitive personal information with semantic equivalencies that are used to train machine learning model 380 (see FIG. 4 and corresponding text for further details). For example, "Kushal"=>"Skilled" because in Hindi, the word "Kushal" has a meaning of "skilled" in English. The words are semantically equivalent so the name is replaced by its meaning and is usable by machine learning model 380.

Metadata mapper 330 is responsible for saving intermediate metadata generated by system 300 that includes recent selections and a policy hash to save for quicker reference. Data policy manager 340 manages polices for machine learning model 380 and generating a policy map. Authorization engine 350 performs machine learning model authentication with system 300 to ensure that only authenticated machine learning models are connected to system 300. Access control 360 manages access control lists and determines whether to allow personal information data. Additionally, access control 360 manages lists for which replacements are allowed/disallowed. Database store 370 stores training data with semantic equivalences in locations where the originally training data included personal information data.

When data repository subsystem 310 receives data access requests to external systems 375 to train machine learning model 380, data repository subsystem 310 locates each personal information attribute in a data tuple and invokes a semantic analysis engine to generate a broader semantic relevance of the field. For textual fields such as username, data repository subsystem 310 calls the semantic analysis engine to generate a proximal alternative to the field. The semantic analysis engine receives parameters as an input and generates a broader proximate with a similar meaning. The broader meaning is generated for better de-identification of original personal information data fields.

In one embodiment, data repository subsystem 310 includes attribute mapping metadata that stores the information about personal and non-personal fields of the dataset. When a data access request is received, training demon 325 validates the authorization for the personal information data access through a calling process. When the personal information data access request is in plaintext, the original contents in the respective row are sent as part of response.

As the personal information data is intelligently transformed in the dataset collection process, the personal information data is not shared with machine learning model 380 and compliance is maintained for the data. At the same time, as the de-identification is performed with semantic equivalent substitutions, machine learning model 380 still articulates some of the insights from the data. As more learning is achieved, machine learning model 380's outcome confidence and success rate increases. Data repository subsystem 310 selects the proximal data which is closest to the actual data to compute outcomes.

Figure 10:
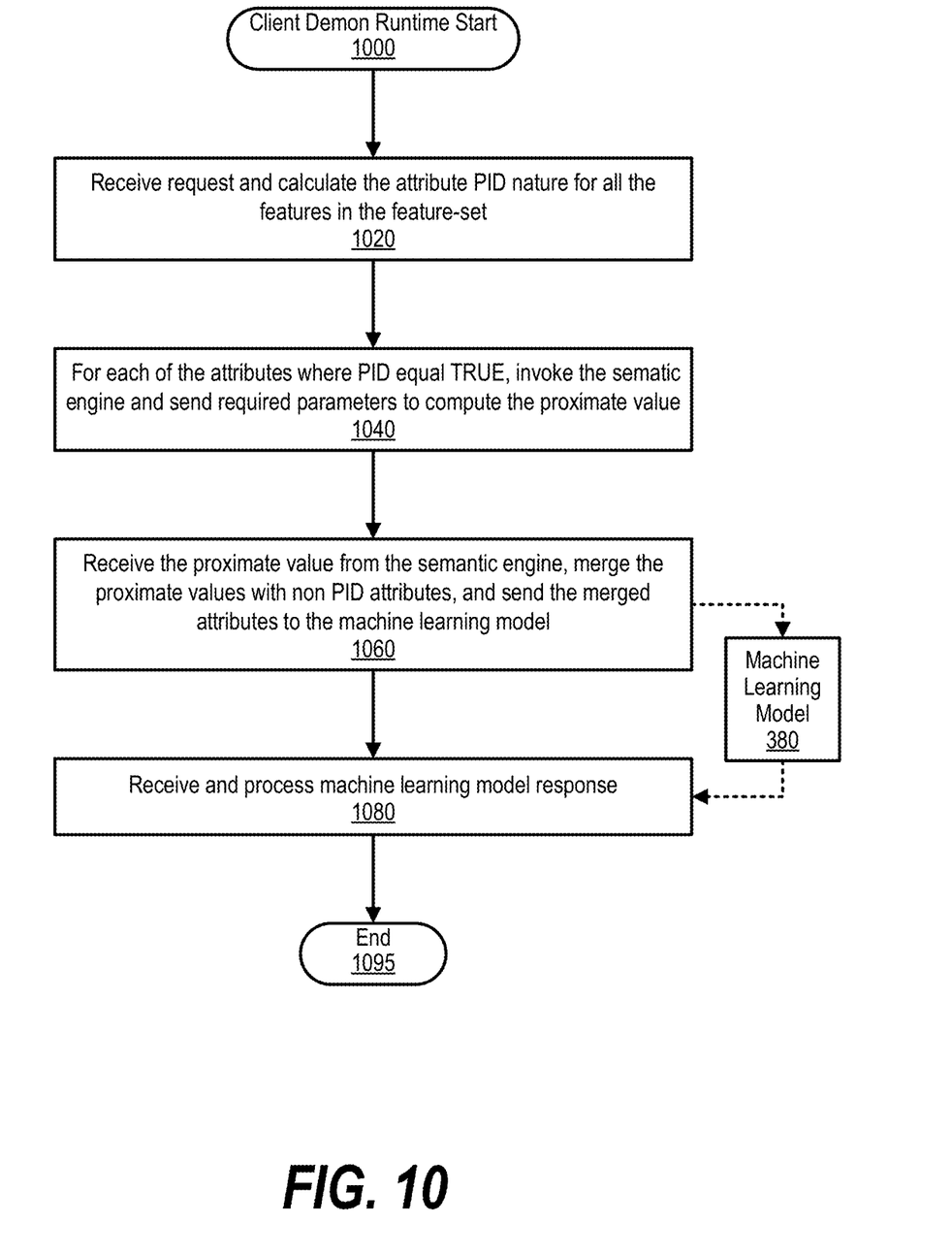
FIG. 10 is an exemplary diagram depicting steps taken to process runtime client requests.

During runtime, client 390 uses client demon 395 to transform personal information data into semantic equivalencies before sending a query to machine learning model 380, thus ensuring no personal information data is sent to machine learning model 380 for computation and achieves better outcome and confidence (see FIG. 10 and corresponding text for further details).

Figure 4:
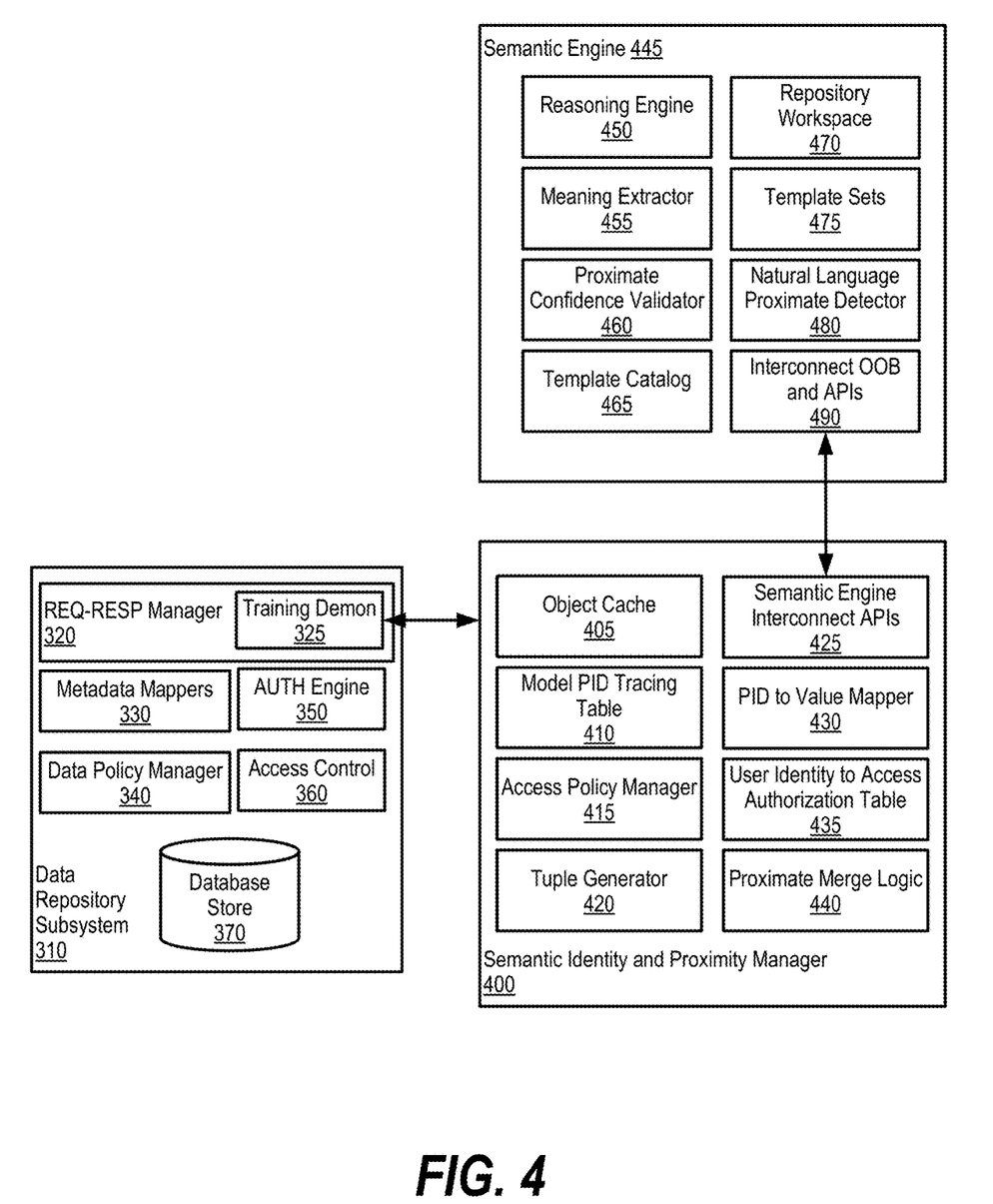
FIG. 4 is an exemplary diagram depicting a training a demon interacting with a semantic identity and proximity manager that calls a semantic engine for semantic processing.

FIG. 4 is an exemplary diagram depicting a training a demon interacting with a semantic identity and proximity manager that calls a semantic engine for semantic processing.

Training demon 325 calls semantic identity and proximity manager 400. Semantic identity and proximity manager 400 has several modules to perform various functions. Object Cache 405 saves recently used semantic equivalents. Model personal information data (PID) tracing table 410 identifies and tags the personal information data attributes. Access Policy Manager 415 performs policy mapping with machine learning models and validation of access policies. Tuple generator 420 is a semantic equivalence map generator (e.g., <Kushal, Skilled>). Semantic engine interconnect API 425 interacts with semantic engine 445 to request and receive semantic equivalencies.

PID to value mapper 430 is a map of PID and its value on a per machine learning model basis. For example, for machine learning model A, <Kushal, Skilled>, for machine learning model B, <Kushal, Good>, etc. PID to value mapper 430 also stores relevance values for semantic equivalences.

User identity to access authorization table 435 maintains an authentication table with machine learning model entities and semantic replacement natures for respective machine learning models. Proximate merge logic 440 merges proximates with a same semantic value to achieve the benefit of randomization.

Semantic engine 445 has several modules to perform various functions. Reasoning engine 450 performs the reasoning of an attribute to identify a best possible match. Meaning extractor 455 extracts the meaning of the PID attribute. Proximate confidence validator 460 identifies the value of relevance. For example, Kushal, Skills, 90% match where confidence is 0.9. Template catalog 465 maintains the history of selection. Repository workspace 470 includes a workspace where the process is running. Template sets 475 include template definitions that are offered upon an upper layer inquiry. Natural language proximate detector 480 is a natural language processor that identifies better attribute alternates. Interconnect OOB and APIs 490 are interfaces to semantic identity and proximity manager 400 to provide semantic equivalencies.

Figure 5:
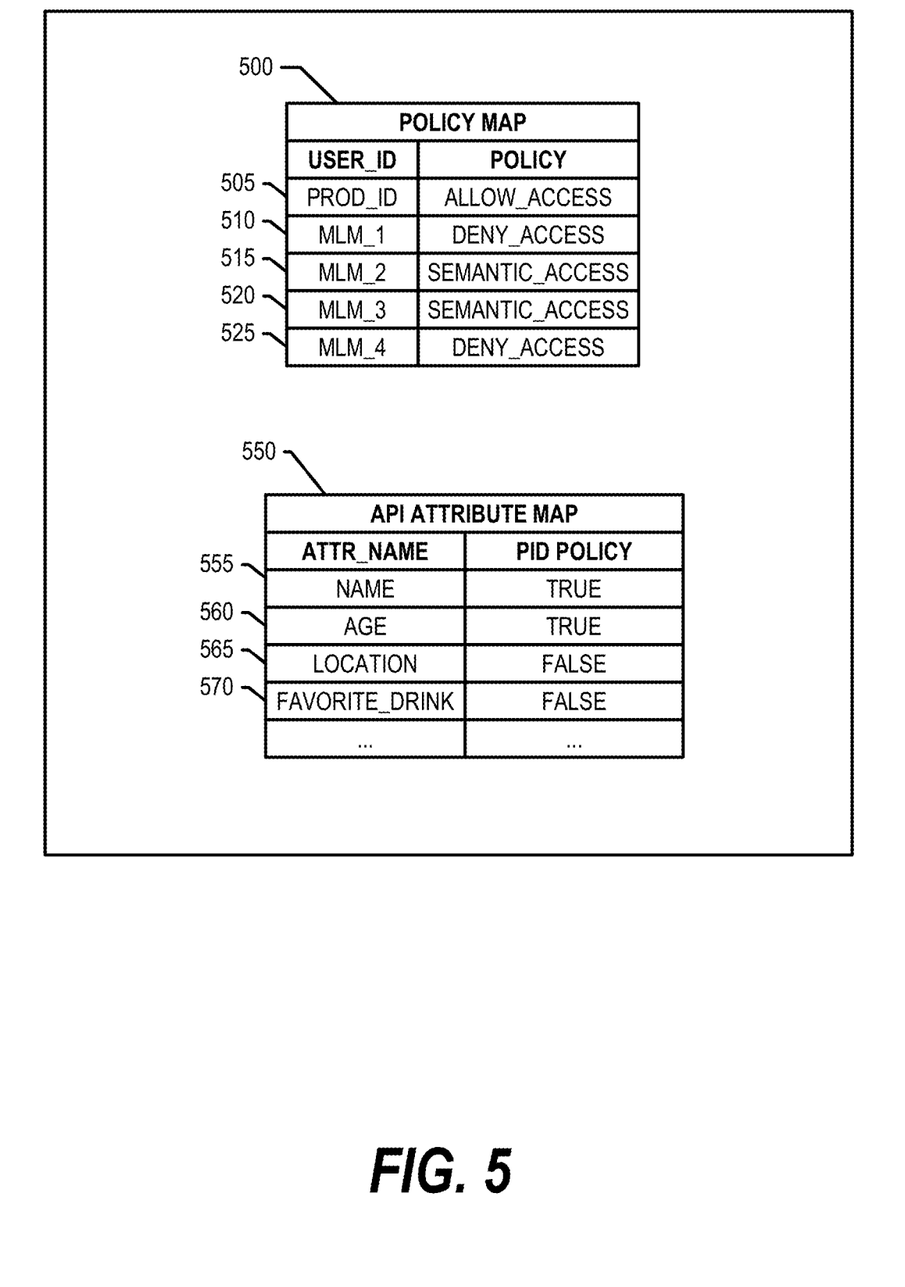
FIG. 5 is an exemplary diagram depicting a policy map and an API attribute map.

FIG. 5 is an exemplary diagram depicting a policy map and an API attribute map. Policy map 500 includes a list of user IDs (machine learning model IDs) and a list of corresponding policies. Entry 505 shows that product ID has an "ALLOW ACCESS" policy, indicating that permission for data access is allowed and data is passed unmasked to the product.

Figure 6:
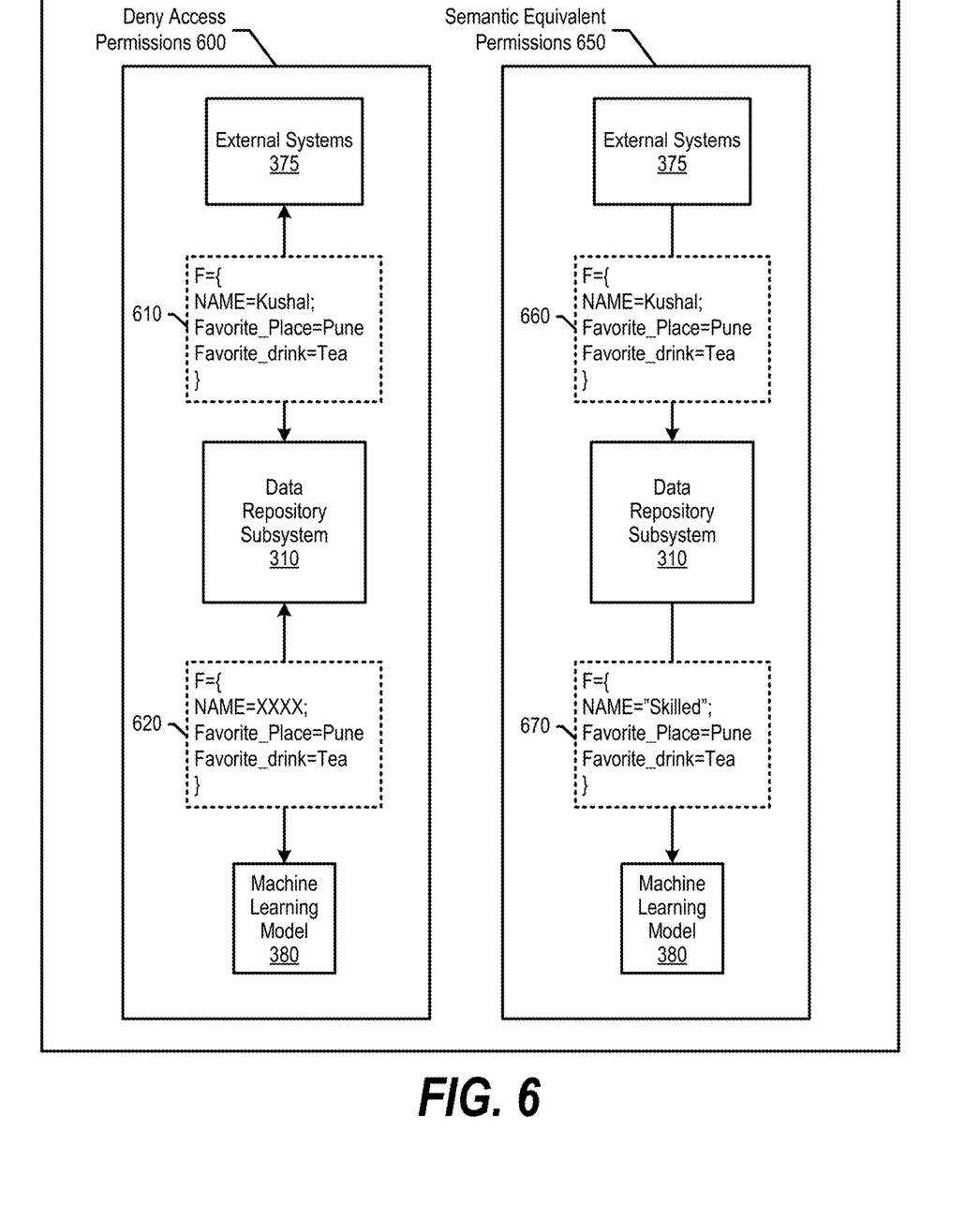
FIG. 6 Is an exemplary diagram depicting various data transformations based on policies.

Entries 510 and 525 show that that machine learning models 1 and 4 have a "DENY ACCESS" policy, indicating that no personal information data access is allowed to be sent to machine learning models 1 or 4 and therefore the personal information data is masked accordingly (see FIG. 6 and corresponding text for further details).

Entries 515 and 520 show that machine learning models 2 and 3 have a "SEMANTIC ACCESS" policy, indicating that the personal information data sent to machine learning models 2 and 3 include semantic equivalent data that replaces personal information data (see FIG. 6 and corresponding text for further details).

API attribute map 550 includes a list of attributes and their corresponding personal information data policies. Entries 555 and 560 show that the name attribute and age attribute have a "TRUE" personal information data policy value, indicating that a person's name and age will either be masked or semantically transformed according to embodiments discussed herein.

Entries 565 and 570 show that the location attribute and the favorite drink attribute have a "FALSE" personal information data policy value, indicating that these values may be passed to a machine learning model for training and client predictions.

FIG. 6 is an exemplary diagram depicting various data transformations based on policies. Deny access permissions data flow 600 shows that data repository subsystem 310 masks the "name" personal information data in data 610 based on map 550 shown in FIG. 5 to generate data 620, which is unhelpful to machine learning model 380.

However, semantic equivalent permissions data flow 650 shows data repository subsystem 310 receiving data 660 from external systems 375. Referring back to FIG. 5 and assuming API Attribute Map 550 is in effect, entry 555 shows that the Name attribute has a "TRUE" personal information data policy, indicating that NAME attribute values should be replaced with semantic equivalent values.

Figure 9:
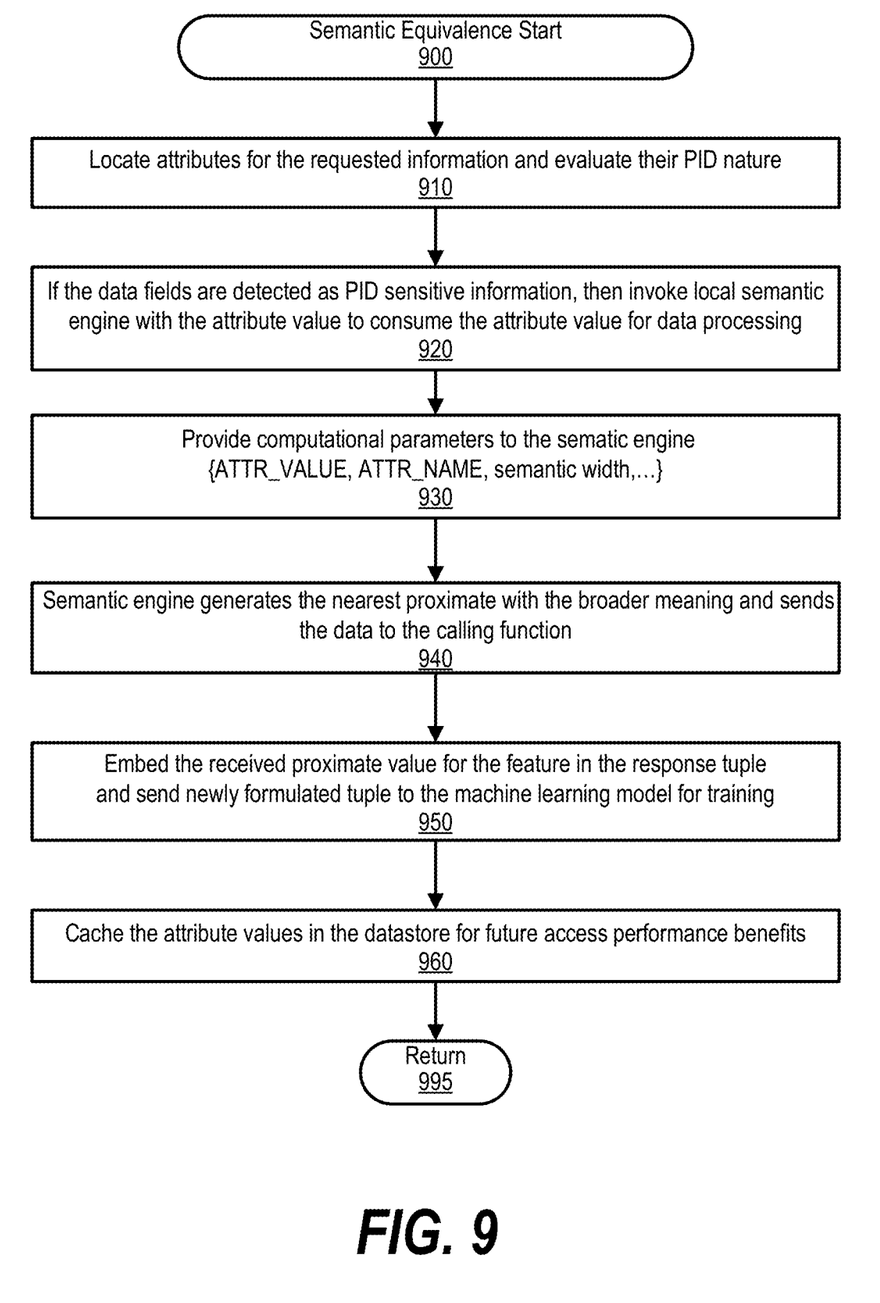
FIG. 9 is an exemplary diagram depicting steps taken to perform semantic analysis on training data and modify the training data based on the semantic analysis.

Therefore, data repository subsystem 310 replaces the name attribute value in data 660 with a semantic equivalent value using steps discussed herein (see FIG. 9 and corresponding text for further details). Data 670 shows that the name attribute value is replaced with "skilled," but the favorite place attribute value and the favorite drink attribute value remain intact. Machine learning model 380 uses semantic equivalent data 670 to train upon without violating personal information data policies.

Figure 7:
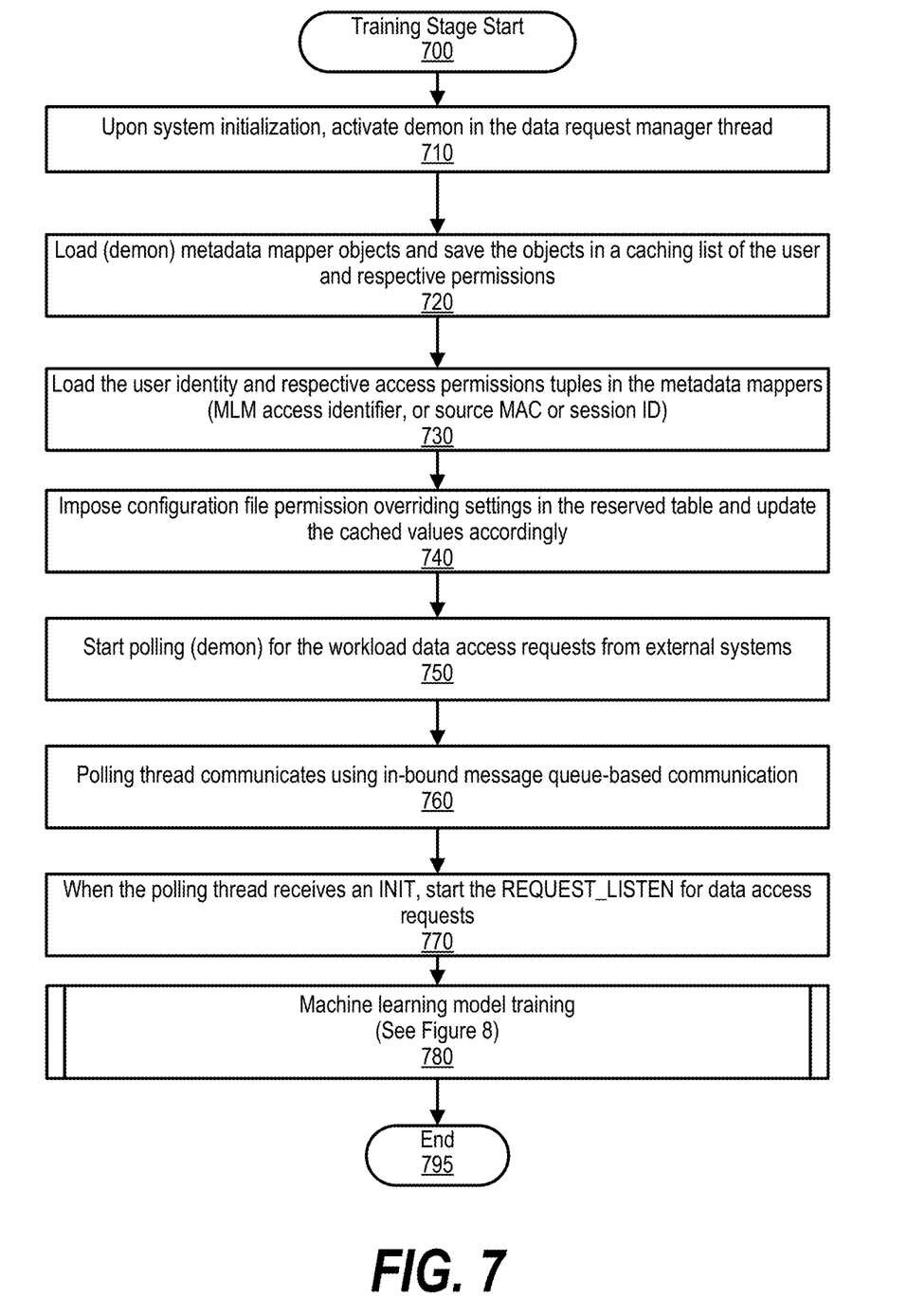
FIG. 7 is an exemplary high-level diagram depicting steps taken in training a machine learning model.

FIG. 7 is an exemplary high-level diagram depicting steps taken in using de-identified semantic equivalent training data to train a machine learning model. Processing commences at 700 whereupon, at step 710, the process activates training demon 325 in request/response manager 320. At step 720, the process (training demon 325) loads metadata mapper objects and saves the objects in object cache 405 of the user and respective permissions.

At step 730, the process loads the user identity and respective access permissions tuples in metadata mappers 330 (machine learning model access identifier, source MAC, session ID, etc.). At step 740, the process imposes configuration file permission overriding settings in a reserved table and updates the cached values accordingly.

At step 750, the process (training demon 325) starts polling for workload data access requests from external systems 375. At step 760, in one embodiment, the process communicates using in-bound message queue-based communication. At step 770, when the polling thread receives an INIT response, the process starts a REQUEST_LISTEN for data access requests. At predefined process 780, the process begins training machine learning model 380 (see FIG. 8 and corresponding text for processing details). FIG. 7 processing thereafter ends at 795.

Figure 8:
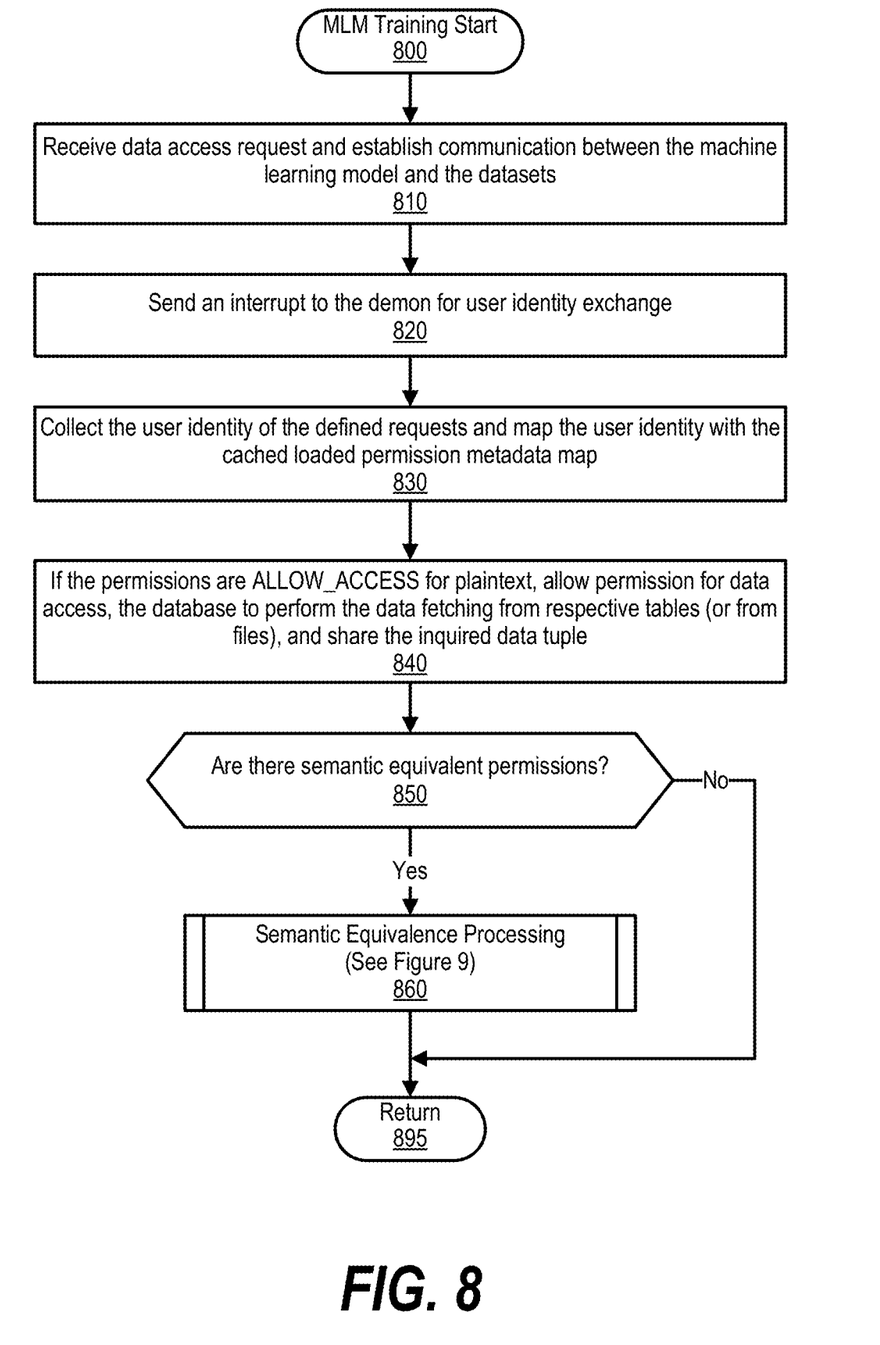
FIG. 8 is an exemplary flowchart showing steps taken to train a machine learning model.

FIG. 8 is an exemplary flowchart showing steps taken to train machine learning model 380. Processing commences at 800 whereupon, at step 810, the process receives a data access request and establishes communication between machine learning model 380 and the datasets in database store 370.

At step 820, the process sends an interrupt to training demon 325 for user identity exchange and, at step 830, the process collects the user identity of the defined requests and maps the user identity to the cached loaded permission metadata map. At step 840, if the permissions are ALLOW_ACCESS for plaintext, the process allows permissions for data access, the database to perform the data fetching from respective tables (or from files), and share the inquired data tuple.

The process determines as to whether there are semantic equivalent permissions (decision 850). If there are semantic equivalent permissions, then decision 850 branches to the 'yes' branch whereupon, at predefined process 860, the process performs semantic equivalence steps on the training data and provides the modified training data to machine learning model 380 (see FIG. 9 and corresponding text for processing details).

On the other hand, if there are not semantic equivalent permissions, then decision 850 branches to the 'no' branch bypassing step 860. FIG. 8 processing thereafter returns to the calling routine (see FIG. 7) at 895.

FIG. 9 is an exemplary diagram depicting steps taken to perform semantic analysis on training data and transform the training data based on the semantic analysis. FIG. 9 processing commences at 900 whereupon, at step 910, the process locates attributes for the requested information and evaluates their personal information data nature.

At step 920, if the data fields are detected as personal information data sensitive information, the process then invokes local semantic engine 445 with the attribute values to consume the attribute value for data processing. At step 930, the process provides computational parameters to the sematic engine {ATTR_VALUE, ATTR_NAME, semantic width, . . . }. At step 940, the process (semantic engine 445) generates the nearest proximate with the broader meaning and sends the data to the calling function, such as <Kushal, Skilled>, <Kushal, Fine>, etc.

At step 950, the process embeds the received proximate value for the feature in the response tuple and sends the newly formulated tuple to the machine learning model for training. At step 960, the process caches the attribute values in the datastore for future access performance benefits. FIG. 9 processing thereafter returns to the calling routine (see FIG. 8) at 995.

FIG. 10 is an exemplary diagram depicting steps taken to process runtime requests at a client. FIG. 10 processing commences at 1000 whereupon, at step 1020, the process (client demon 395) receives a client request and calculates the personal information data nature of each of the features in the feature set of the request.

At step 1040, for each of the attributes where personal information data is TRUE, the process invokes a sematic engine (on client 390) and sends required parameters to compute the proximate value. At step 1060, the process receives the proximate values from the semantic engine, merges the proximate values with non-personal information data attributes, and sends the merged attributes to machine learning model 380.

At step 1080, the process receives and processes machine learning model 380's response and FIG. 10 processing thereafter ends at 1095.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   detecting a set of personal information data corresponding to a set of users in a set of training data;
   transforming the set of training data into a set of semantically equivalent training data by replacing the set of personal information data with a set of semantic equivalent data, wherein the set of semantic equivalent data contains de-identified data with dimension retention;
   training a machine learning model using the set of semantically equivalent training data, comprising:
      loading metadata mapper objects into an object cache;
      loading a user identity and associated access permissions into the metadata mapper objects; and
      responsive to a polled thread receiving a response, requesting access to the semantically equivalent training data based on the cached metadata mapper objects; and
   responsive to a runtime query from a client device, transforming personal information within the runtime query into semantic equivalencies, wherein the personal information is replaced with a semantic proximate associated with the set of semantic equivalent data and transmitted to the trained machine learning model.

2. The method of claim 1 further comprising:
   retrieving a record corresponding to a selected one of the set of users, wherein the record comprises a plurality of attribute values;
   determining that a subset of the plurality of attribute values corresponds to a personal information data policy; and
   replacing the subset of attribute values with a subset of the set of semantic equivalent data in response to determining that the subset of the plurality of attribute values corresponds to the personal information data policy.

3. The method of claim 2 further comprising:
   accessing a policy map comprising a plurality of policies corresponding to a plurality of machine learning models; and transforming the set of training data into a set of semantically equivalent training data in response to determining that the machine learning model corresponds to a semantic access policy in the policy map.

4. The method of claim 3 wherein at least one of the plurality of policies is selected from the group consisting of an allow access policy, a deny access policy, and the semantic access policy.

5. The method of claim 1 further comprising:
   inputting the set of training data into a semantic engine; and
   generating, by the semantic engine, the set of semantically equivalent training data.

6. The method of claim 1 further comprising:
receiving, by a client demon, a request comprising a set of feature values;
determining a personal information attribute indicator of each of the set of feature values; and
invoking a semantic engine to transform at least one of the set of feature values based on their corresponding personal information attribute indicator.

7. The method of claim 6 further comprising:
receiving a set of semantic proximate values from the semantic engine that corresponds to the at least one feature value;
merging the set of semantic proximate values with the set of feature values; and
sending the merged set of semantic proximate values and the set of feature values to the trained machine learning model.

8. An information handling system comprising:
one or more processors;
a memory coupled to at least one of the processors;
a set of computer program instructions stored in the memory and executed by at least one of the processors in order to perform actions of:
   detecting a set of personal information data corresponding to a set of users in a set of training data;
   transforming the set of training data into a set of semantically equivalent training data by replacing the set of personal information data with a set of semantic equivalent data, wherein the set of semantic equivalent data contains de-identified data with dimension retention;
   training a machine learning model using the set of semantically equivalent training data, comprising:
      loading metadata mapper objects into an object cache;
      loading a user identity and associated access permissions into the metadata mapper objects; and
      responsive to a polled thread receiving a response, requesting access to the semantically equivalent training data based on the cached metadata mapper objects; and
   responsive to a runtime query from a client device, transforming personal information within the runtime query into semantic equivalencies, wherein the personal information is replaced with a semantic proximate associated with the set of semantic equivalent data and transmitted to the trained machine learning model.

9. The information handling system of claim 8 wherein the processors perform additional actions comprising:
retrieving a record corresponding to a selected one of the set of users, wherein the record comprises a plurality of attribute values;
determining that a subset of the plurality of attribute values corresponds to a personal information data policy; and
replacing the subset of attribute values with a subset of the set of semantic equivalent data in response to determining that the subset of the plurality of attribute values corresponds to the personal information data policy.

10. The information handling system of claim 9 wherein the processors perform additional actions comprising:
accessing a policy map comprising a plurality of policies corresponding to a plurality of machine learning models; and transforming the set of training data into a set of semantically equivalent training data in response to determining that the machine learning model corresponds to a semantic access policy in the policy map.

11. The information handling system of claim 10 wherein at least one of the plurality of policies is selected from the group consisting of an allow access policy, a deny access policy, and the semantic access policy.

12. The information handling system of claim 8 wherein the processors perform additional actions comprising:
inputting the set of training data into a semantic engine; and
generating, by the semantic engine, the set of semantically equivalent training data.

13. The information handling system of claim 8 wherein the processors perform additional actions comprising:
receiving, by a client demon, a request comprising a set of feature values;
determining a personal information attribute indicator of each of the set of feature values; and
invoking a semantic engine to transform at least one of the set of feature values based on their corresponding personal information attribute indicator.

14. The information handling system of claim 13 wherein the processors perform additional actions comprising:
receiving a set of semantic proximate values from the semantic engine that corresponds to the at least one feature value;
merging the set of semantic proximate values with the set of feature values; and
sending the merged set of semantic proximate values and the set of feature values to the trained machine learning model.

15. A computer program product stored in a computer readable storage medium, comprising computer program code that, when executed by an information handling system, causes the information handling system to perform actions comprising:
detecting a set of personal information data corresponding to a set of users in a set of training data;
transforming the set of training data into a set of semantically equivalent training data by replacing the set of personal information data with a set of semantic equivalent data, wherein the set of semantic equivalent data contains de-identified data with dimension retention;
training a machine learning model using the set of semantically equivalent training data, comprising:
   loading metadata mapper objects into an object cache;
   loading a user identity and associated access permissions into the metadata mapper objects; and
   responsive to a polled thread receiving a response, requesting access to the semantically equivalent training data based on the cached metadata mapper objects; and
responsive to a runtime query from a client device, transforming personal information within the runtime query into semantic equivalencies, wherein the personal information is replaced with a semantic proximate associated with the set of semantic equivalent data and transmitted to the trained machine learning model.

16. The computer program product of claim 15 wherein the information handling system performs further actions comprising:
- retrieving a record corresponding to a selected one of the set of users, wherein the record comprises a plurality of attribute values;
- determining that a subset of the plurality of attribute values corresponds to a personal information data policy; and
- replacing the subset of attribute values with a subset of the set of semantic equivalent data in response to determining that the subset of the plurality of attribute values corresponds to the personal information data policy.

17. The computer program product of claim 16 wherein the information handling system performs further actions comprising:
- accessing a policy map comprising a plurality of policies corresponding to a plurality of machine learning models; and
- transforming the set of training data into a set of semantically equivalent training data in response to determining that the machine learning model corresponds to a semantic access policy in the policy map.

18. The computer program product of claim 17 wherein at least one of the plurality of policies is selected from the group consisting of an allow access policy, a deny access policy, and the semantic access policy.

19. The computer program product of claim 15 wherein the information handling system performs further actions comprising:
- inputting the set of training data into a semantic engine; and
- generating, by the semantic engine, the set of semantically equivalent training data.

20. The computer program product of claim 15 wherein the information handling system performs further actions comprising:
- receiving, by a client demon, a request comprising a set of feature values;
- determining a personal information attribute indicator of each of the set of feature values;
- invoking a semantic engine to transform at least one of the set of feature values based on their corresponding personal information attribute indicator;
- receiving a set of semantic proximate values from the semantic engine that corresponds to the at least one feature value;
- merging the set of semantic proximate values with the set of feature values; and
- sending the merged set of semantic proximate values and the set of feature values to the trained machine learning model.

* * * * *